April 27, 1948.  C. L. TOMLINSON  2,440,312
APPARATUS FOR TRANSMITTING MOTION PICTURE LIGHT IMAGES
Filed Jan. 5, 1946   2 Sheets-Sheet 1
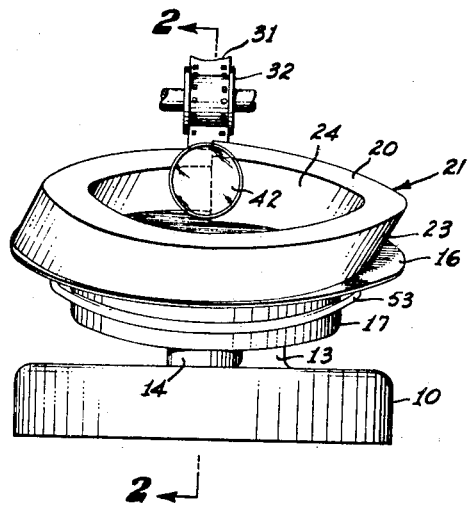
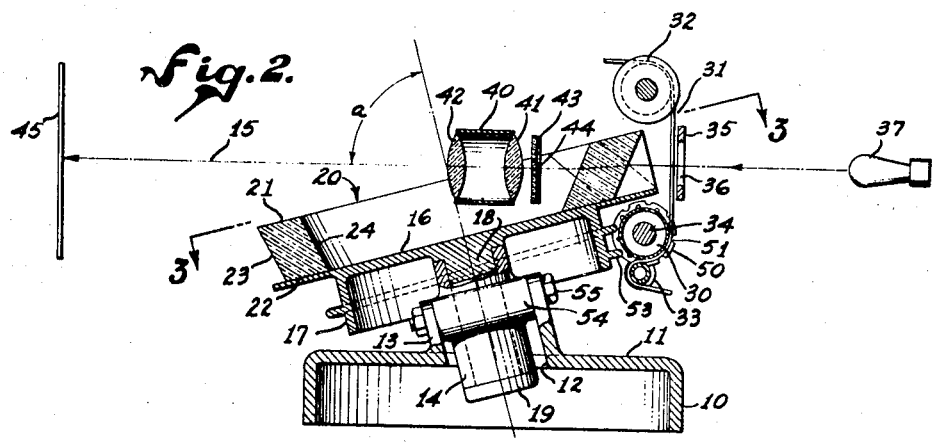
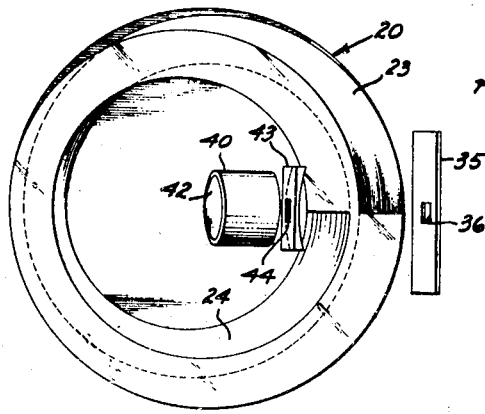
CLARENCE L. TOMLINSON,
INVENTOR.
BY
*Herbert A. Huebner*
ATTORNEY.

April 27, 1948.  C. L. TOMLINSON  2,440,312
APPARATUS FOR TRANSMITTING MOTION PICTURE LIGHT IMAGES
Filed Jan. 5, 1946  2 Sheets-Sheet 2
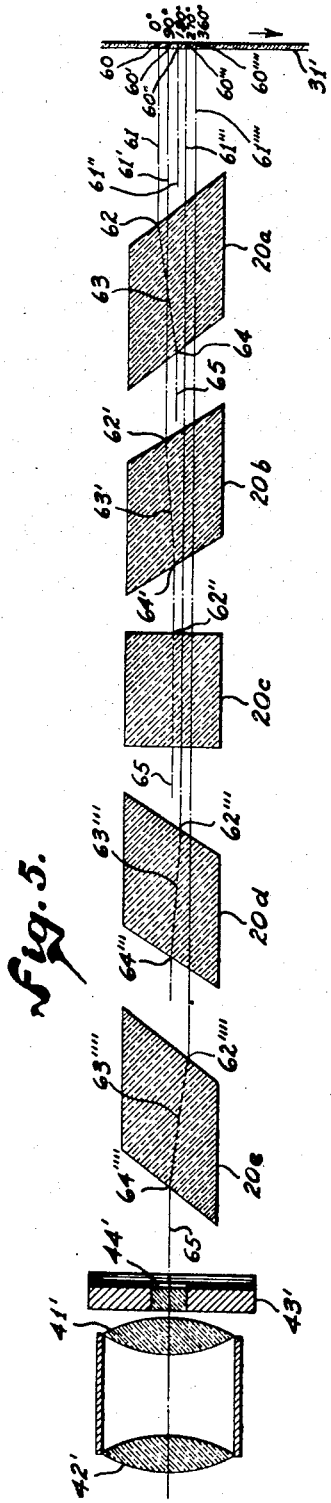
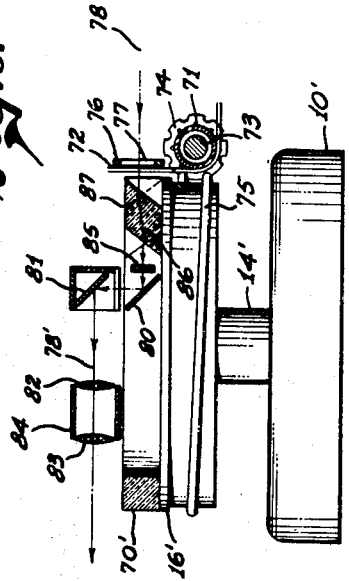
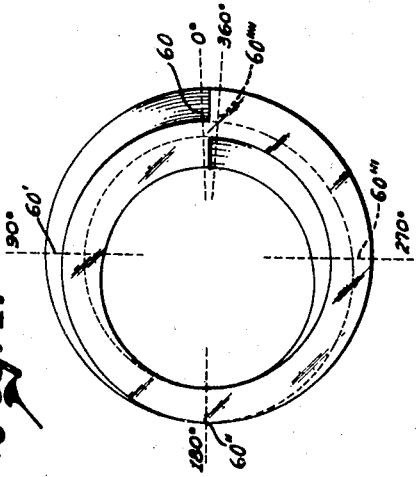
Clarence L. Tomlinson,
INVENTOR.
BY
ATTORNEY.

Patented Apr. 27, 1948

2,440,312

UNITED STATES PATENT OFFICE 2,440,312

APPARATUS FOR TRANSMITTING MOTION-PICTURE LIGHT IMAGES

Clarence L. Tomlinson, Los Angeles, Calif., assignor of one-half to Robert Jay Brandt, Los Angeles, Calif.

Application January 5, 1946, Serial No. 639,307

23 Claims. (Cl. 88—16.8)

The invention relates to motion picture devices and has particular reference to a lens system for transmitting motion picture light images which will effect the reproduction of a succession of images appearing on successive frames of a strip of motion picture film so that there is a substantially instantaneous transition from one image to another.

Standard motion picture projection calls for 24 frames per second or approximately 90 feet per minute. The action is intermittent effected by a pull-down mechanism, with a period of absolute dwell before the light aperture, during which dwell a rotating shutter permits light to pass through the stationary film frame. One-fifth of the total elapsed time is utilized in moving the film, and during this time the shutter closes the light aperture. The wear and tear on both film and equipment is necessarily substantial. Moreover, the sound track is scanned by a light beam while the film is moving continuously so there is necessarily a separation between the sound track and a particular picture frame which coincides with the sound element.

For many years motion picture engineers have sought to evolve a continuous projection of the pictures, that is, to keep the film in continuous motion. That is the primary object of the present invention. When film can be moved continuously past the projecting aperture and there is no interruption of a light passage, 20% additional light reaches the screen in the continuous process, and there is no shutter to intercept the light at any time.

Moreover, in the presently practiced intermittent method of projection the optical phenomenon known as persistence of vision is utilized. It has been found in practice that 24 successive light impulses or projections per second tend to cause eye strain and flicker. In order to eliminate this, the standard rotating shutter has been divided so that each picture is actually seen twice, and although 24 picture frames per second are projected, each frame is viewed twice due to an interruption of the light by the shutter giving 48 impressions per second.

On the contrary, the continuous method of this invention provides for a rotating prism making one revolution while a picture frame is moving from an upper to a lower position a distance equal to the height of the frame, the total movement of the film during one revolution of the prism covering an area equal to twice the height of a single frame and of the same width.

The principles evolved by the present invention are applicable not only to a projector but to a camera also. A photograph can be made through a prism the same way projection is accomplished. A camera utilizing the system is of great advantage in that, for example, less light is needed on the set in technicolor. There light has to be exceedingly brilliant and any reduction has a great advantage on color photography. A marked advantage is also experienced in black and white photography. This same principle is equally applicable to projection printing by utilizing the same principle for that process. The system has further advantages in that by the substitution of a spiral or worm gear drive for conventional drives silent operation is emphasized even under high speeds. At low speeds flicker is eliminated or negligible, and slow motion effects can be obtained by slower operation of the film thus effecting an actual reduction in film footages. Still scenes in particular may be advantageously run slowly for maximum effect.

Among the objects of the invention, therefore, is to provide a new and improved lens system for a motion picture device which is adapted to dispense with the necessity for advancing film step by step in order to make possible the reproduction of successive frames of pictures.

Another object of the invention is to provide a new and improved motion picture device which is adapted to make possible the reproduction of a succession of frames of pictures on a motion picture film while the film runs steadily and continuously through the device.

Still another object is to provide a new and improved motion picture device which is adapted to eliminate the necessity of use of a shutter as well as the customary pull-down mechanism and thereby permit the film to pass continuously through the device.

A further object is to incorporate into a motion picture device a refracting medium interposed in the path of light through the device which has a configuration such that as the refracting medium is moved with respect to the path of light it effects a change in the location of the image on one side of the medium at a rate which is cooperable with the rate of movement of the film in such a manner that while the image on one side is moving through a predetermined distance a reproduction of the image on the other side of the medium remains in a stationary location.

Included, also, in the objects of the invention is the provision of a refracting medium which is somewhat annular in shape for the purpose of shifting the location of an image, the medium being adapted to a rotary motion so that the change in location of the image may be repeated at predetermined intervals at a rate conforming to the rate of advance of frames of pictures on the film.

The objects also include a means of arranging the refracting media so as not to interfere with a straight line passage of light through the device and adjustable to such an extent that an image carried by the path of light may be shifted one way or another into a correct position with respect to either the film or an image produced by the film.

Included further among the objects is the provision of a lens system incorporating a refracting element making it possible to move the film at a continuous, uninterrupted rate which is adapted equally well to incorporation in either a projecting machine, a camera or a projection printer.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a front elevational view of the device.

Figure 2 is a longitudinal, sectional view of the device taken on the line 2—2 of Figure 1.

Figure 3 is a plan view of the device as seen on the line 3—3 of Figure 2.

Figure 4 is a plan view of the reflector element indicating arbitrary stations about the circumference.

Figure 5 is an exploded, diagrammatic view showing the effect of the reflector element at the various stations indicated in Figure 4 upon a beam of light passing through the lens system.

Figure 6 is an elevational view partially in section showing a modified form of the device.

The description herein is directed to read upon a motion picture device in the nature of a projection system or projection machine. This mode of explaining the system has been selected by way of example as being clearly illustrative of the principles involved. Only the essentials of the lens system and necessary operating media are incorporated so that the functioning of the lens system to produce the desired effect may be most easily demonstrated.

In order that motion pictures when thrown on a screen may convey to the eye an impression of movement of images in the picture, common practice, and the practice followed also by this method, is to project upon a screen a succession of images or frames of pictures wherein the images of the moving objects in each successive frame are changed slightly in order to give the effect of motion. Actually, the images are a succession of still pictures thrown one after another on the screen separated by a brief interval while the screen is blacked out, during which interval the frames of pictures are changed. The blacking out permits the film to pass from one frame to the next without the line of demarcation between the frames being seen by the eye. By reason of the commonly known optical phenomenon of persistent vision, the eye follows the changes in the images without being conscious of the blackout between successive frames.

The present invention incorporates a refracting element which is adapted to replace the customary shutter and intermittent pull-down which advances the film frame by frame. By the provision of the particular refracting element, the location of the image originating in the frame on the film is maintained in fixed position upon the projection screen while the film actually moves progressively through the device a distance about equal to the height of one full frame. This is accomplished by changing the angle of the refracting surface with respect to the axis of the path of light through the film, or with respect to the plane of the film, whichever way may be considered. The invention utilizes the physical phenomenon of refraction of light through a transparent element by changing the relationship of the surface of the refracting element to a beam or ray of light so that one portion of the beam or ray of light on one side of the refracting medium is shifted with relation to a portion of the same beam or ray of light on the other side of the refracting medium.

For example, by use of the device an image viewed through different portions of the refracting medium or element will appear to the eye to remain in the same position while the image actually shifts from one position to another. This arrangement permits the projected image to remain the same while the source of the image, namely, the film, actually moves from one position to another. By use of this device a succession of images is thrown on the screen so that the visual effect is much the same as the effect of the images projected by an ordinary motion picture projector. The means of accomplishing it, however, is different.

In an embodiment chosen to illustrate the application of the principle to a projection machine there is shown a lens system and mounting therefor comprising a base 10 having an upper surface 11 in which is a central aperture 12. On the upper surface 11 is a bracket 13 adapted to support a journal housing 14 tipped at a predetermined angle with relation to the base and to the axis of the path of light indicated by the dot and dash line 15. A rotating base comprising a disk-like element 16, a skirt 17 and a central shaft 18 is mounted so that the shaft 18 is rotatably received within the journal housing 14. Some convenient means such as a washer 19 may be used to hold the parts in place.

A refractor element identified generally by the character 20 is herein shown as having a substantially annular shape and is made with an upper flat face 21, a lower flat face 22 parallel thereto and having an outer curved wall 23 and an inner curved wall 24.

The refractor element is firmly secured on the mounting by some convenient means such, for example, as an adhesive or other appropriate fastening device. The element is so shaped and mounted that the axis of the element coincides with the axis of the shaft 18 which is likewise the axis of rotation of the mounting, the flat faces 21 and 22 being parallel and normal to the axis of rotation. In the particular example shown, the axis of rotation has an angle (a) equal to 75°. This angle, however, is selected arbitrarily in the embodiment described by way of example only.

Also incorporated in the system comprising the motion picture device is a pull-down sprocket 30 which is provided with the usual teeth adapted to engage a motion picture film 31, an idler sprocket 32 and a second idler sprocket 33 adapted to hold the film in position on the pull-down sprocket. The pull-down sprocket is mounted upon a shaft 34 driven by some suitable mechanism not shown.

Adjacent the film is a framing aperture member 35 which has a central aperture 36 herein shown as having a height equal to twice the height of a frame of pictures on the film and a width just equal to the width of the same frame. A lamp 37 is illustrated as comprising a source of light passing from the lamp through the aperture 36, the film 31 and thence through the refractor element 20.

On the side of the refractor element opposite from the film and framing aperture is a lens member comprising the customary tube 40 mounting a pair of lenses 41 and 42. Between the lens member and the adjacent face or inner wall 24 of the refractor element is a correcting lens 43 blacked over except for a central framing area 44 which is centrally located relative to the path of light and has the same height and width as a frame of pictures on the film. As indicated particularly in Figure 3, the correcting lens may be said to comprise a plano-concave cylindrical lens with the concave side facing the inner wall of the refractor element. The correction is therefore confined to a transverse direction as opposed to a correction in a vertical direction. The correcting lens is designed to correct any distortion which might be produced by reason of the fact that the refractor element is likewise curved in a transverse plane, having substantially cylindrical curved outer and inner walls through which the light passes.

In accordance with the arrangement of the device herein described a ray of light can be assumed as passing from the source 37 in a straight line through the aperture 36, through the film 31 and thence to the outer surface 23 of the refractor element. Upon striking the refractor element the ray of light may be bent a predetermined amount depending upon the density of the substance comprising the refractor element, and the ray will continue in the bent direction for a distance depending upon the thickness of the refractor element or, in other words, the distance between the outer and inner walls. Upon striking the inner surface 24 the ray of light is again bent into a direction parallel to, but in most instances spaced from, the initial direction of the ray of light. The ray will continue in a straight line from the inner surface 23 through the aperture 44 and thence through the lenses 41 and 42 from which it will pass to a projection screen 45. It will be appreciated, of course, that should the system be used in a camera the path of travel of a ray of light would be in a reverse direction.

As the device is laid out for the structure illustrated in Figures 1, 2 and 3 there must be one complete 360° rotation of the mounting for the refractor element while the film is advanced one full frame. Obviously, the film advancing mechanism must be synchronized with rotation of the the refractor element. Although many mechanical devices may be suitable to effect the necessary synchronization, in order to simplify an understanding of the device there has been selected, by way of example, a spiral drive. This is incorporated in a spiral gear 50 having a series of spiral recesses 51 which are adapted to engage worm gear elements 53 of relatively steep pitch on the otuside wall of the skirt 17. The spiral gear is keyed to the shaft 34 which drives the pull-down sprocket. By suitably arranging the ratio of spiral recesses 51 to the pitch of the worm gear elements 53 the mechanism may be set so that while the pull-down sprocket is moving through an angular distance sufficient to advance the film one frame the refractor element is rotated a full 360°.

An additional adjustment has been found advantageous and useful in centering and orienting an image projected from the device upon a screen in the event the base may not be on a level surface. This comprises a lug 54 on the journal housing 14 extending in a direction 90° removed from the direction of the axis of the path of light. The lug is secured to the bracket 13 by means of a pin 55 which can be tightened or loosened at will. When the pin is loosened the axis of the shaft 18 within the housing 14 may be tilted a slight amount in order to correct verticality in the orientation of the image upon the screen.

It is felt that an understanding and appreciation of the theory of operation of the device may best be obtained from an examination of the diagrams of Figures 4 and 5. Figure 4, which is a plan view of one form of an annular refractor element, has been laid out in stations. The first station has been indicated as 0°. The second station is indicated as 90°, the third as 180°, the fourth as 270° and the fifth as 360° but at a location on the opposite side of a line of demarcation between one end of the refractor element having an angular pitch at one direction and the other end of the same having the same angular pitch but in the opposite direction. The distance between the 0° station and the 360° station may be regarded as infinitesimal.

In Figure 5 there is shown a diagrammatic lay-out corresponding to the stations indicated in Figure 4. In Figure 5 at the stations indicated the cross-sectional configuration of the refractor element at the particular station is shown in outline. For example, the cross-sectional outline for the refractor element at station 0° is the outline indicated by the character 20a, the cross-sectional outline at station 90° by 20b, the cross-sectional outline at station 180° by 20c, at station 270° by 20d and at station 360° by 20e. For the sake of illustration the path of a motion picture film is indicated at 31'. A correcting lens 43' is blacked out except at the very center where there is a clear aperture for light 44'. Lenses 41' and 42' receive light from the aperture 44' and project it on a suitable screen.

Let is be assumed that a point 60 on the film is just entering the path of light through the device. A ray of light 61 passing through the point 60 will travel in a straight line until it impinges upon the surface of the refractor element at station 0°, at the point 62. The ray of light will then be bent along a path 63 within the refractor element until it emerges at a point 64 from whence it again travels in a straight line 65 which passes directly through the center of the aperture 44 and then through the center of the lenses 41 and 42.

Next assume that the refractor element has advanced to the second station, namely, a station 90° removed from the first station. When the element has rotated to this position the cross-section shape of the element which is the shape of the cross-section at station 90° will be as illustrated by the character 20b in Figure 5.

In the meantime, the point 60 will have passed downwardly one-fourth of the height of a frame until it occupies a position indicated as point 60'. A ray of light passing through the point 60' will travel along a straight path 61' until it hits a point 62' on the outer surface of the refractor element at station 90° or as illustrated at 20b in Figure 5. The light will then be refracted along a path 63' through the material of the element and will emerge at a point 64' which is in precise alignment with the path 65 of a ray emerging at the point 64 as previously described. This will again be in precise alignment with the center of the aperture 44' and the lenses.

Again let us assume that the refractor element has rotated an additional 90° to the 180° station indicated by the cross-section 20c in Figure 5. In the meantime, the point 60 will have advanced again an additional distance of one-fourth of the height of a frame so that it occupies a position 60''. A ray of light passing through the position 60'' will travel in a straight line 61'' to a point 62'' on the outside surface of the refractor element at station 180°. The outside wall of the element at this point being perpendicular to the line of direction of the ray of light there will be no refraction, and the ray will continue to pass straight through the refractor element on the straight line 65 previously referred to and thence directly through the center of the aperture 44'.

Next let us assume that the point 60 advances to the position 60'''. During this advance the refractor element will yet again rotate another 90° to station 270° wherein it will have a cross-section of the shape indicated at 20d in Figure 5. This time a ray of light passing through the point at position 60''' will travel along a straight line 61''', below the previous paths until it impinges upon the outer surface of the refractor element at a point 62'''. Here again the ray will be refracted or bent within the material of the refractor element, but this time in an upward direction.

It is commonly known that refraction of a ray of light passing from a less dense medium to a more dense medium when it strikes the surface of the medium at an angle will tend to bend to an angle more nearly normal to the surface of the material. It will also be appreciated that the thickness of the material has a relation to the point at which a ray of light passing through the material emerges at the oposite side.

As illustrated in the diagram, the ray of light impinging at the point 62''' will be bent along a straight line path 63''' within the material until it emerges at a point 64''' at the opposite or inner face. Yet again this point 64''' will be in precise alignment with the path 65 of the ray which emerged from the point 64 at station 0° or 20a.

Finally, the point 60 will pass downwardly to the position 60'''' which will be removed from the initial position of the point at 0° by a distance equal to one full height of the frame. A ray of light through the point at position 60'''' passes along a straight line 61'''' until it impinges against the outer surface of the refractor element at a point 62'''' which will be spaced below the point of impingement 62 a distance equal to the distance between the position of point 60 at 0° and the position 60'''', as indicated at the extreme right-hand end of Figure 5. The angle of the outer face of the refractor element again having changed causes the ray impinging on the point 62'''' to pass along a straight line 63'''' until it hits the opposite face from which it emerges at a point 64'''' which is finally once again on the same straight line 65 as the ray which emerged initially at the point 64.

This means that although the point 60 actually moved a substantial distance equal to the full height of a frame of pictures on the film, the image of the point has remained precisely at the center of the aperture 44' and consequently has remained at precisely the same point on the projection screen. By reference to any other point on the film during this same interval it will be apparent that the image of every other point likewise remains in the same position on the projection screen even though every other point itself moves physically a distance equal to one full height of a frame of pictures on the film.

Following one complete rotation of the refractor element there will be an abrupt change or transition where the angle at station 360° reverses itself as to direction so that it assumes the position at station 0°. Reversal of the angle of the refractor element immediately shuts off the image of the point 60 and accompanying points within an associated frame of the motion picture film and shifts to corresponding points in the next successive frame. Due to the fact that the framing aperture, as previously described, is twice the height of a frame of pictures on the film, two frames will always be completely illuminated. The image of only one frame at a time, however, will be projected upon the projection screen. As the angle of the refractor element shifts abruptly from that indicated at station 360° to that indicated at 0° the image of the first frame on the film will be wiped off and the image of the second frame immediately projected upon the screen.

Meanwhile, however, the film is continuing its uninterrupted movement downwardly. At the same time, however, the refractor element is continuing its rotation at a corresponding speed so that the actual points comprising the physical source of the image on the film are moving downwardly, but their projected images transmitted through the refractor element at its successive positions continue to occupy the same position on the screen so that the image of the second frame remains fixed in position on the screen during one full 360° revolution of the refractor element until there again occurs the abrupt change in the angle of the outer and inner faces which occurs between stations 360° and 0°.

It will be apparent that by proper arrangement of the angles at the faces of the refractor element and by suitably proportioning the rate of movement of the refractor element to the rate of movement of the film, the device is capable of reproducing a series of images on a projection screen each of which remains fixed in position on the screen for a predetermined length of time until the next image is instantaneously flashed on the screen in place of the first while the film meanwhile travels at a steady, uninterrupted rate of speed through the device.

As a matter of convenience, the refractor element 20, as illustrated in Figure 2, may be pitched so that its axis of rotation is at an angle of 75° with respect to the axis of the path 15 of light. An arrangement of this kind eliminates any necessity for use of prisms or mirrors and enables light to be passed directly from the film through the refractor element, the correcting lens and the projection lens member to the screen. The angle of the axis of rotation may likewise be referred to as pitched from a vertical reference line by an amount equal to 15° in the present illustration.

On some occasions, however, it may be found more appropriate to have the refractor element rotating upon a perpendicular axis, as illustrated in Figure 6. Under such circumstances, a base 10' may be provided with a shaft housing 14' upon which is rotatably mounted a mounting 16' which supports a refractor element 70. The shaft housing is vertically disposed, and the mounting and refractor element rotate in a horizontal plane. In this modification, also, there is provided a pull-down sprocket 71 for a motion picture film 72 which is keyed to a drive shaft 73. Likewise keyed to the drive shaft is a spiral gear 74 which is adapted to mesh with a worm 75 of relatively steep pitch so that the refractor element 70 is rotated in conformance with movement of the film. A framing aperture mounting 76 is provided with the customary framing aperture 77 having double the height of a frame of pictures on the film and being of the same width as the frame.

In this instance, the refractor element is so shaped that the direction of a ray of light 78 after passing through the wall of the refractor element continues in a direction parallel to its initial direction. It therefore becomes necessary to redirect the ray of light outwardly so that it may be projected upon a screen. To accomplish this there is provided a mirror 80 positioned at an angle of 45° with respect to the path of the ray of light and a second mirror 81 similarly positioned at a 45° angle adapted to receive light from the first mirror and redirect it along a parallel path 78' through lenses 82 and 83 secured in a housing 84. In this arrangement, likewise, is a correcting lens 85 used in order to compensate for the curvature of the refractor element.

In order that the ray of light may be directed as proposed, the refractor element has an inner wall 86 and an outer wall 87 parallel thereto pitched at an angle of 22½° in one direction at one point on the circumference which would correspond to station 0°, as indicated in the diagrammatic representation of Figure 4. The angle of disposition of the inner and outer walls varies about the circumference of the refractor element so that at a point corresponding to station 180° the walls are perpendicular to the axis of the path of light and continue changing in angle and angular direction so that at a point corresponding to station 360° the walls are again disposed at a 22½° angle but in a direction opposite to the direction of the angle at station 0°. By this disposition of angles at the walls of the refractor element the axis of a path of light is maintained horizontal at its point of emergence. The image of the frame on the motion picture film remains fixed on a projection screen in the same manner as was described in connection with Figures 4 and 5. The scheme of operation in the modified form, with the exception of the direction of travel of the beam of light, is the same as with the originally described form.

Variations in the arrangement and optical strength of lenses 41 and 42 may be resorted to depending upon whether the device is to be used for a projector, a camera or for projection printing. In the latter case the printing may be of the same size, larger or smaller, depending on the lenses used, without other variation being necessary in the system.

It will also be apparent from a comparison of the refractor element 20 of Figures 1, 2 and 3, which is pitched from the vertical at an angle of 15°, and the element 70 of Figure 6, that the angular difference between the slope of the walls at opposite ends is 45°. When the plane of the refractor element is pitched at an angle from the horizontal the angle between the walls at the ends and a vertical reference may be different from that where the plane is horizontal. The slope or angle of the wall of the refractor element, however, will be the algebraic sum of 22½° and the angle of pitch from a vertical reference, plus or minus, depending on the direction of pitch or the end being measured.

Since the thickness of the refractor element has a bearing on the displacement of a beam of light, either a variation in the thickness or a variation in the angle of the wall surface may be resorted to in order to accommodate frames of different heights. Refractor elements may be built with equal facility for 8 mm., 16 mm. and 35 mm. film by properly adjusting the wall angle to the thickness.

Marked success in the operation of the device has been found when providing a refractor element substantially annular in shape. It will be appreciated, however, that the principle of operation involving a refractor element may be incorporated into any elongated element which is capable of continuous movement through a path of light emerging from a motion picture film which is maintained in constant uninterrupted motion. The shape and value of the correcting lens will depend upon the shape of the adjacent surface of the refractor element.

By incorporating the principles of the system herein described there may be constructed a motion picture device comprising either a projector, a camera or a printer which is capable of utilizing a film run at a continuous rate of speed while at the same time capable of reproducing a series of fixed images. The device lends itself to simplicity of construction and is economical in the quantity of light necessary to operate it as compared with motion picture devices of the conventional sort heretofore used and operated. The device of this invention lends itself to careful adjustment and safe operation where light sources of high intensity are involved.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent systems.

Having described my invention, what I claim as new and desire to secure by Letters Patent is:

1. A lens system for motion picture film adapted to be interposed in a path of light comprising a framing aperture member having an opening in the path of light greater in area than a frame of said film, a refractor element of predetermined length and uniform thickness having opposite parallel walls wherein the angle of the walls relative to the axis of the path of light varies from end to end of said length an amount adapted to accommodate a shift in location of a ray of light on one wall equal to the height of said frame and a zero shift in said ray on the opposite wall during movement of said refractor element a distance equal to said predetermined length.

2. A lens system for motion picture film adapted to be interposed in a path of light comprising a framing aperture member having an opening in the path of light greater in area than a frame of said film, a refractor element of predetermined length and uniform thickness having opposite parallel walls wherein the angle of the walls relative to the axis of the path of light varies from end to end of said length an amount adapted to accommodate a shift in location of a ray of light on one wall equal to the height of said frame and a zero shift in said ray on the opposite wall during movement of said refractor element a distance equal to said predetermined length, and a second framing aperture member on the side of said reflector element opposite from said first framing element having an aperture therein substantially equal in dimension to said frame of the film.

3. A lens system for motion picture film adapted to be interposed in a path of light comprising a framing aperture member having an opening in the path of light greater in length than a frame of said film, a refractor element of predetermined length and uniform thickness having opposite parallel walls wherein the angle of the walls relative to the axis of the path of light varies from end to end of said length an amount adapted to accommodate a shift in location of a ray of light on one wall equal to the height of said frame and a zero shift in location of said ray on the opposite wall during movement of said refractor element a distance equal to said predetermined length, a second framing aperture member on the side of said refractor element opposite from said first framing element having an aperture therein substantially equal in dimension to said frame of the film and a lens member in the path of light adjacent said second framing aperture member.

4. A lens system for motion picture film adapted to be interposed in a path of light comprising a framing aperture member having an opening in the path of light not less than twice the height of a frame of said film, a refractor element of predetermined length and uniform thickness having opposite parallel walls wherein the angle of the walls relative to the axis of the path of light varies from end to end of said length an amount adapted to accommodate a shift in location of a ray of light on one wall equal to the height of said frame and a zero shift in said ray on the opposite wall during movement of said refractor element a distance equal to said predetermined length, a second framing aperture member on the side of said refractor element opposite from said first framing element having an aperture therein substantially equal in dimension to said frame of the film and a lens member in the path of light adjacent said second framing aperture member, said second framing aperture member comprising a lens complementary in transverse optic effect to the transverse optic effect of said refractor element.

5. A lens system for motion picture film adapted to be interposed in a path of light comprising a framing aperture member having an opening in the path of light greater in area than a frame of said film, a refractor element of predetermined length and uniform thickness incorporating upper and lower faces and having opposite parallel walls in the path of light, the angle of the walls relative to a plane normal to the faces being equal to 22½° at an end in one direction and 22½° at the other end in the opposite direction and adapted thereby to accommodate a shift in location of a ray of light on one wall equal to the height of said frame and a zero shift in said ray on the opposite wall during movement of said refractor element a distance equal to the distance between said ends.

6. A lens system for motion picture film adapted to be interposed in a path of light comprising a framing aperture member having an opening in the path of light greater in area than a frame of said film, a refractor element of predetermined length and uniform thickness incorporating upper and lower faces and having opposite parallel walls in the path of light, the faces of said walls at one end of said predetermined length being at an angle of substantially 45° to the faces of the walls at the other end, said walls having the angle thereof relative to the direction of said path of light varying uniformly throughout the length and adapted to displace the path of a ray of light impinging upon one wall a distance equal to the height of said frame and to displace said ray at the opposite wall a distance of substantially zero during movement of said refractor element a distance equal to the distance between said ends.

7. In a motion picture device incorporating a base, a lens system, a continuously operating film advancing mechanism and a framing aperture for a motion picture film in a path of light through the device, the combination of a refracting element of uniform thickness and a movable support for said element on the base, said refracting element comprising an elongated body of transparent material located in the path of light and having opposite parallel walls, said walls having an angular relation to the axis of said path of light varying progressively and uniformly so that the angle between cross sections of the element at opposite ends of a predetermined length bears a relation to the refraction characteristics and the thickness adapted to effect a change in the location of a ray of light at one wall thereof equal to a predetermined amount during movement of said portion of the refracting element from one end to the other through the path of light and to effect a zero change in location of said ray at the opposite wall for a corresponding movement.

8. In a motion picture device incorporating a base, a lens system, a continuously operating film advancing mechanism and a framing aperture for a motion picture film in a path of light through the device, the combination of a refracting element of uniform thickness and a movable support for said element on the base, said refracting element comprising an elongated body of transparent material located in the path of light and having opposite parallel walls, said walls having an angular relation to the axis of said path of light varying progressively and uniformly so that the angle between cross sections of the element at opposite ends of a predetermined length bears a relation to the refraction characteristics and the thickness adapted to effect a change in the location of a ray of light at one wall thereof equal to a predetermined amount during movement of said portion of the refracting element from one end to the other through the path of light and to effect a zero change in location of said ray at the opposite wall for a corresponding movement, said first change being equal to the height of a frame of film, movement of said film being transverse to the movement of said refracting element at a rate equal to one frame for a movement of said refracting element from end to end.

9. In a motion picture device incorporating a base, a lens system, a continuously operating film advancing mechanism and a framing aperture member for a motion picture film having an aperture adjacent the film at the area of passage of light therethrough, the combination of a substantially annular refracting element of uniform thickness and a rotating support for said element having an axis of rotation coincident with the axis of the refracting element and mounted rotatably on the base, said refracting element comprising a transparent material having inner and outer walls parallel with respect to each other, said walls having an angular relation to the axis of said refracting element varying from a first angle at one point on the circumference progressively and uniformly throughout 360° to a second angle, the difference between said angles bearing a relation to the light refracting character of the transparent material adapted to accommodate a change in the location of a ray of light on one wall during one 360° rotation of the refracting element equal to one full frame height during a change in location of said ray of light on the opposite wall of zero for said 360° rotation.

10. In a motion picture device incorporating a base, a lens system, a continuously operating film advancing mechanism and a framing aperture member for a motion picture film adjacent the film at the area of passage of light therethrough, the combination of a substantially annular refracting element of uniform thickness, and a rotating support for said element having an axis of rotation coincident with the axis of the refracting element and mounted rotatably on the base, said refracting element comprising a transparent material having inner and outer walls parallel with respect to each other, said walls having an angular relation to the axis of said refracting element varying from a first angle at one point on the circumference progressively and uniformly through 360° to a second angle, the difference between said angles bearing a relation to the light refracting character of the transparent material and the wall thickness thereof adapted to accommodate a change in the location of a ray of light on one wall throughout one 360° rotation of the refracting element equal to one full frame height while a zero change in location of said ray of light on the opposite wall takes place for said 360° rotation.

11. In a motion picture device incorporating a base, a lens system, a continuously operating film advancing mechanism and a framing aperture member for a motion picture film adjacent the film at the area of passage of light, the combination of a substantially annular refracting element of uniform thickness and a rotating support for said element having an axis of rotation coincident with the axis of the refracting element, said refracting element comprising a transparent material having inner and outer walls parallel with respect to each other, said walls having an angular relation to the axis of said refracting element varying from a first angle at one point on the circumference progressively and uniformly throughout 360° to a second angle, the difference between said angles bearing a relation to the light refracting character of the transparent material effective to accommodate a change in the location of a ray of light on one wall equal to one full frame height during one 360° rotation of the refracting element for a change in location of said ray of light on the opposite wall of zero for said 360° rotation, said film having a rate of advance of one frame for each 360° rotation of the refracting element.

12. In a motion picture device incorporating a base, a lens system, a continuously operating film advancing mechanism and a framing aperture member for a motion picture film adjacent the film at the area of passage of light therethrough, the combination of a substantially annular refracting element of uniform thickness and a rotating support for said element having an axis of rotation coincident with the axis of the refracting element, said support being mounted rotatably on the base, said refracting element comprising a transparent material having inner and outer walls parallel with respect to each other and having an angular relation to the axis of said refracting element varying from a first angle at one point on the circumference progressively and uniformly throughout 360° to a second angle, the difference between said angles bearing a relation to the light refracting character of the transparent material and the wall thickness thereof effective to accommodate a change in the location of a ray of light on one wall equal to one full frame height during one 360° rotation of the refracting element for a change in location of said ray of light on the opposite wall of zero for said 360° rotation, said framing aperture being equal to twice the height and equal in width to the respective height and width of a frame of a film.

13. In a motion picture device incorporating a base, a lens system, a continuously operating film advancing mechanism and a framing aperture member for a motion picture film adjacent the film at the area of pasage of light, the combination of a substantially annular refracting element of uniform thickness having an outer convex wall and a parallel inner concave wall, a rotating support for said element having an axis of rotation coincident with the axis of the refracting element and mounted rotatably on the base, said film advancing mechanism having a driving engagement with said rotating support adapted to effect simultaneous cooperable movement of said support with said film, said framing aperture member being located adjacent the convex wall at one side of said refracting element, and a correcting lens adjacent the opposite concave wall of the refracting element at said one side having an aperture therein substantially equal in size to the frame size of the film.

14. In a motion picture device incorporating a base, a lens system, a continuously operating film advancing mechanism and a framing aperture member for a motion picture film adjacent the film at the area of passage of light, the combination of a substantially annular refracting element of uniform thickness having an outer convex wall and a parallel inner concave wall, a rotating support for said element having an axis of rotation coincident with the axis of the refracting element and mounted rotatably on the base, said film advancing mechanism having a driving engagement with said rotating support adapted to effect simultaneous cooperable movement of said support with said film and located adjacent the convex wall at one side of said refracting element, and a correcting lens adjacent the opposite concave wall of the refracting element at said one side having an aperture therein substantially equal in size to the frame size of the film, and said lens having a transverse curvature in reverse with respect to the curvature of the refracting element in a transverse direction.

15. In a motion picture device incorporating a base, a lens system, a continuously operating film advancing mechanism and a framing aperture member for a motion picture film having an aperture adjacent the film at the area of passage of light, the combination of a substantially annular refracting element of uniform thickness having an inner concave wall and a parallel outer convex wall, a rotating support for said element having an axis of rotation coincident with the axis of the refracting element and mounted rotatably on the base, said film advancing mechanism having a driving engagement with said rotating support adapted to effect simultaneous cooperable movement of said support with said film and located adjacent the convex wall at one side of said refracting element, and a correcting lens adjacent the opposite concave wall of the refracting element at said one side having an aperture therein substantially equal in size to the frame size of the film, said lens having a transverse curvature in reverse with respect to the curvature of the refracting element in a transverse plane, said framing aperture, said refracting element and said correcting lens defining a true path of light therebetween and in the path of rotation of the refracting element, said lens system being adjacent the correcting lens and on the side remote from the refracting element.

16. In a motion picture device incorporating a base, a lens system, a continuously operating film advancing mechanism and a framing aperture member for a motion picture film having an aperture adjacent the film at the area of passage of light, the combination of a substantially annular refracting element of uniform thickness having an inner concave wall and an outer convex wall, a rotating support for said element having a parallel axis of rotation coincident with the axis of the refracting element and mounted rotatably on the base, said film advancing mechanism having a driving engagement with said rotating support adapted to effect simultaneous cooperable movement of said support with said film, said framing aperture being located adjacent the convex wall at one side of said refracting element and a correcting lens adjacent the opposite concave wall of the refracting element at said one side having an aperture therein substantially equal in size to the frame size of the film, said correcting lens having a transverse curvature in reverse with respect to the curvature of the refracting element in a transverse plane, said framing aperture and said correcting lens defining a path of light therebetween and through the wall of the refracting element in the path of rotation thereof, said lens system being adjacent the correcting lens and in the side remote from the refracting element, said film having a rate of advance of one frame for each 360° rotation of the refracting element.

17. In a motion picture device incorporating a base, a lens system, a continuously operating film advancing mechanism and a framing aperture member for a motion picture film having an aperture adjacent the film at the area of passage of light, the combination of a substantially annular refracting element of uniform thickness, a rotating support for said element having an axis of rotation coincident with the axis of the refracting element, said support being mounted rotatably on the base and tilted at an angle relative to the base, said refracting element comprising a transparent material having inner and outer walls parallel with respect to each other, said walls having an angular relation to the axis of said refracting element varying progressively and uniformly from a first angle at one point on the circumference throughout 360° to a second angle, the angular relation being adapted to accommodate a change in the location of a ray of light on one wall equal to one full frame height during one 360° rotation of the refracting element for a change in location of said ray of light on the opposite wall of zero for said 360° rotation, the wall of said refracting element at said first angle making an angle with a reference perpendicular to the base equal to the algebraic sum of one half the difference between said first and second angles and the angle of tilt from the reference of the axis of rotation.

18. In a motion picture device incorporating a base, a lens system, a continuously operating film advancing mechanism and a framing aperture member for a motion picture film having an aperture adjacent the film at the area of passage of light, the combination of a substantially annular refracting element of uniform thickness, a rotating support for said element having a vertical axis of rotation coincident with the axis of the refracting element and mounted rotatably on the base, said refracting element comprising a transparent material having inner and outer walls parallel with respect to each other, said walls having an angular relation to the axis of said refracting element varying progressively and uniformly from a first angle at one point of the circumference throughout 360° to a second angle and adapted to accommodate a change in the location of a ray of light on one wall equal to one full frame height during one 360° rotation of the refracting element for a change in location of said ray of light on the opposite wall of zero for said 360° rotation, the wall of said refracting element at said first angle making an angle with a vertical reference of one half the difference between said first and second angles, said lens system comprising a reflecting element within the inner wall of the refracting element in the path of light adapted to deflect light outwardly transverse to the plane of said refracting element, a second reflecting element located exteriorly relative to the inner walls of the refracting element adapted to redirect the light, and a lens member in the path of light in the line of redirection.

19. In a motion picture device incorporating a base, a lens system, a continuously operating film advancing mechanism and a framing aperture member for a motion picture film having an aperture adjacent the film at the area of a path of light, the combination of a substantially annular refracting element of uniform thickness, a rotating support for said element on the base, said refracting element comprising a transparent material having inner and outer walls parallel with respect to each other, said walls at one end of a section of predetermined length having an angular displacement from the walls at the other end of said length bearing a relation to the angle of refraction and distance between said walls adapted to accommodate a change in the location of a ray of light on one wall equal to the height of one full frame during rotation throughout said length and a zero change in location of said ray on opposite wall during said rotation, said film having a rate of advance equal to a frame height during movement of the refracting element from one end to another of said section through the path of light.

20. In a motion picture device incorporating a base, a lens system, a continuously operating film advancing mechanism and a framing aperture for a motion picture film having an aperture in a path of light through the device, the combination of a refractor element of uniform thickness and a movable support for said element on the base, said refractor element comprising an elongated body of transparent material located in the path of light and having opposite parallel walls, said walls having an angular relation to the axis of said path of light varying progressively and uniformly so that the angle between cross sections of the element at opposite ends of a portion of predetermined length bears a relation to the refraction characteristics and the thickness adapted to accommodate a change in the location of a ray of light at one wall thereof equal to a predetermined amount during movement of said portion of the refractor element from one end to the other through the path of light and to accommodate a zero change in location of said ray at the opposite wall for a corresponding movement, said lens system comprising a pair of reflecting elements and a lens member, one of said reflecting elements being located adjacent one wall of the refractor element and the other reflecting element being located in a position laterally removed therefrom and adapted to effect a relocation of a portion of the path of light in a line exterior and parallel to the path of light at the other wall of the refractor element.

21. A lens system for motion picture film adapted to be interposed in a path of light comprising a refractor element of predetermined length and uniform thickness having opposite parallel walls wherein the angle of said walls relative to the axis of the path of light varies from end to end of said length an amount adapted to accommodate a transverse shift in location of a ray of light on one wall equal to a unit length of film and a zero shift in said ray on the opposite wall during movement of said refractor element a distance equal to said predetermined length.

22. A lens system for motion picture film adapted to be interposed in a path of light comprising a refractor element of predetermined length and uniform thickness, said element having refraction characteristics varying progressively and uniformly between parallel faces along said length an amount adapted to accommodate a shift in location of a ray of light on one wall a predetermined distance transversely with respect to the refractor element and a zero shift transversely in said ray on the opposite wall during movement of said refractor element a predetermined distance along said length.

23. In a motion picture apparatus, the combination of means for moving a film with uninterrupted motion, and means for refracting a light beam to or from said film while said film is travelling whereby such beam travels synchronously with said film between the film and refracting element without affecting or being affected by the fixed direction of the beam at the opposite side of the refracting element, said refracting element comprising a substantially annular prism having parallel faces, a uniform thickness and a cross-section of continuous modification, and means to rotate said prism in a plane at an angle to the plane of the film and transversely to the direction of travel of the film.

CLARENCE L. TOMLINSON.

REFERENCES CITED

The following references are of record in the file of this patent:

UNITED STATES PATENTS

| Number | Name | Date |
| --- | --- | --- |
| 1,219,403 | Selby | Mar. 13, 1917 |
| 1,440,466 | Jenkins | June 2, 1923 |
| 1,356,787 | Porter | Oct. 26, 1920 |
| 1,957,457 | Holman | May 8, 1934 |

FOREIGN PATENTS

| Number | Country | Date |
| --- | --- | --- |
| 527,526 | France | July 27, 1921 |
| 493,995 | Germany | Mar. 17, 1930 |

---

Certificate of Correction

Patent No. 2,440,312.　　　　　　　　　　　　　　　　　　April 27, 1948.

CLARENCE L. TOMLINSON

It is hereby certified that error appears in the printed specification of the above numbered patent requiring correction as follows:

Column 2, line 6, the word "technicolor" which represents a trade-mark should read "*Technicolor*";

and that the said Letters Patent should be read with this correction therein that the same may conform to the record of the case in the Patent Office.

Signed and sealed this 15th day of February, A. D. 1949.

[SEAL]

THOMAS F. MURPHY,
*Assistant Commissioner of Patents.*